(12) United States Patent
Medvedev et al.

(10) Patent No.: US 6,862,271 B2
(45) Date of Patent: Mar. 1, 2005

(54) MULTIPLE-INPUT, MULTIPLE-OUTPUT (MIMO) SYSTEMS WITH MULTIPLE TRANSMISSION MODES

(75) Inventors: Irina Medvedev, Somerville, MA (US); Jay Rod Walton, Westford, MA (US); Mark Wallace, Bedford, MA (US)

(73) Assignee: Qualcomm Incorporated, San Diego, CA (US)

( * ) Notice: Subject to any disclaimer, the term of this patent is extended or adjusted under 35 U.S.C. 154(b) by 148 days.

(21) Appl. No.: 10/085,456

(22) Filed: Feb. 26, 2002

(65) Prior Publication Data

US 2003/0161282 A1 Aug. 28, 2003

(51) Int. Cl.⁷ ................................................ H04Q 7/00
(52) U.S. Cl. ...................... 370/329; 370/208; 342/354; 455/132
(58) Field of Search ................................ 342/354, 430; 455/132, 133, 134, 135, 136, 137, 138; 370/329, 310, 328, 332, 339, 208

(56) References Cited

U.S. PATENT DOCUMENTS

| | | | |
|---|---|---|---|
| 5,351,274 A | | 9/1994 | Chennakeshu et al. |
| 5,592,490 A | * | 1/1997 | Barratt et al. ............... 370/310 |
| 5,642,353 A | * | 6/1997 | Roy, III et al. ............. 370/329 |
| 5,828,658 A | * | 10/1998 | Ottersten et al. ........... 370/310 |
| 6,298,092 B1 | * | 10/2001 | Heath et al. ................. 375/267 |
| 6,362,781 B1 | * | 3/2002 | Thomas et al. ............. 342/383 |
| 2002/0132600 A1 | * | 9/2002 | Rudrapatna .............. 455/277.1 |
| 2003/0086514 A1 | * | 5/2003 | Ginis et al. ................. 375/346 |

FOREIGN PATENT DOCUMENTS

| | | |
|---|---|---|
| WO | 98/09381 | 3/1998 |
| WO | 01/43309 A2 | 6/2001 |
| WO | 01/76110 A2 | 10/2001 |
| WO | 02/01732 A2 | 1/2002 |
| WO | 02/001732 A3 | 1/2002 |

OTHER PUBLICATIONS

Chung et al., "Approaching Eigenmode BLAST Channel Capacity Using V–BLAST with Rate and Power Feedback", Oct. 2001, IEEE Vehicular Technology Conference—Fall 2001, pp. 915–919.*

* cited by examiner

*Primary Examiner*—Duc Ho
(74) *Attorney, Agent, or Firm*—Philip R. Wadsworth; Thien T. Nguyen; Rupit Patel

(57) ABSTRACT

Techniques to transmit data on a number of transmission channels in a multi-channel communication system using multiple transmission schemes requiring less channel-state information (CSI). These schemes may include a partial-CSI transmission scheme that transmits a single data stream on each transmit antenna selected for use and a "beam-forming" transmission scheme that allocates all transmit power to a single transmission channel having the best performance. Each transmission scheme may provide good or near-optimum performance for a specific range of operating conditions (or operating SNRs). These multiple transmission schemes may then be combined in a piece-wise fashion to form a "multi-mode" transmission scheme that covers the full range of operating conditions supported by the MIMO system. The specific transmission scheme to be used for data transmission at any given moment would then be dependent on the specific operating condition experienced by the system at that moment.

35 Claims, 3 Drawing Sheets

MULTIPLE-INPUT, MULTIPLE-OUTPUT (MIMO) SYSTEMS WITH MULTIPLE TRANSMISSION MODES

BACKGROUND

1. Field

The present invention relates generally to data communication, and more specifically to multi-channel communication systems (e.g., multiple-input, multiple-output (MIMO) systems) with multiple transmission modes.

2. Background

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. If the propagation paths between the transmit and receive antennas are linearly independent (i.e., a transmission on one path is not formed as a linear combination of the transmissions on other paths), which is generally true to at least an extent, then the likelihood of correctly receiving a data transmission increases as the number of antennas increases. Generally, diversity increases and performance improves as the number of transmit and receive antennas increases.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized. For example, an independent data stream may be transmitted on each of the $N_S$ spatial subchannels to increase system spectral efficiency.

The spatial subchannels of a MIMO system may experience different channel conditions (e.g., different fading and multipath effects) and may achieve different signal-to-noise ratios (SNRs) for a given amount of transmit power. Consequently, the data rates that may be supported by the spatial subchannels may be different from subchannel to subchannel, depending on the amount of transmit power allocated to the data streams and their achieved SNRs. Since the channel conditions typically vary with time, the transmission capacities of the spatial subchannels also vary with time.

A key challenge in a coded communication system is to effectively utilize the total transmit power, $P_{tot}$, available at the transmitter for data transmission on the $N_S$ spatial subchannels based on the channel conditions. Various schemes may be used to transmit data on the spatial subchannels. Each transmission scheme may require certain types of information regarding the MIMO channel and may further be premised on certain signal processing at the transmitter and receiver. In general, more complicated transmission schemes may be able to achieve spectral efficiency closer to optimum by allocating different amounts of transmit power to spatial subchannels of different capabilities and pre-conditioning the data streams prior to transmission over these subchannels. However, these transmission schemes generally require more information regarding the MIMO channel, which may be difficult to obtain at the receiver and also requires air-link resources to report to the transmitter. Less complicated transmission schemes may provide good performance over only a limited range of operating conditions, but may require less channel information.

There is therefore a need in the art for techniques to transmit data in a MIMO system to achieve high spectral efficiency and having reduced complexity.

SUMMARY

Techniques are provided herein to transmit data over the available transmission channels in multi-channel communication systems such that higher overall system spectral efficiency and/or other benefits may be achieved. The transmission channels may correspond to the spatial subchannels of a MIMO system, the frequency subchannels of an OFDM system, or the spatial subchannels of the frequency subchannels in a MIMO-OFDM system.

In an aspect, multiple transmission schemes are selectively used to provide overall efficiency near or approaching optimum. Each transmission scheme is dependent on whether full or partial channel-state information (CSI) (described below) is available at the transmitter to process data prior to transmission over the transmission channels. For a partial-CSI transmission scheme, a data stream may be transmitted on each transmit antenna (e.g., at the peak transmit power for the antenna). All or only a subset of the $N_T$ transmit antennas may be used for data transmission at any given moment.

For a full-CSI transmission scheme, one or more data streams are processed at the transmitter based on full-CSI processing (or a variant thereof, as described below) and transmitted over the MIMO channel. The full-CSI transmission scheme includes a water-filling transmission scheme, a "selective channel inversion" transmission scheme, a "uniform" transmission scheme, a "principal eigenmode beam-forming" transmission scheme, and a "beam-steering" transmission scheme, all of which rely on full-CSI processing at the transmitter. The water-filling transmission scheme allocates more transmit power to transmission channels with less noise and less transmit power to more noisy channels. The water-filling transmission scheme is optimal and can achieve capacity. The selective channel inversion transmission scheme allocates transmit power non-uniformly over selected ones of the transmission channels such that the post-detection SNRs are similar for the selected transmission channels. The uniform transmission scheme allocates the total transmit power equally among all transmission channels, and the beam-forming transmission scheme allocates all transmit power to a single transmission channel having the best performance. The beam-steering transmission scheme uniformly allocates the total transmit power to all transmit antennas used for transmitting a single data stream, but the data stream is transmitted with the proper phases from these transmit antennas. In general, any number and type of transmission schemes may be employed by a multi-mode MIMO system to provide improved overall performance.

Each transmission scheme may provide good or near-optimum performance for a specific range of operating conditions, which may be quantified by an operating signal-to-noise ratio (SNR). These multiple transmission schemes of different types (i.e., based on partial CSI, full CSI, and so on) may then be combined in a piece-wise fashion to form a "multi-mode" transmission scheme that covers the full range of SNRs supported by the MIMO system. The specific transmission scheme to be used to transmit data at any given moment would then be dependent on the specific operating condition experienced by the system at that moment.

In a specific embodiment, a method is provided for transmitting data on a number of transmission channels in a multi-channel communication system. In accordance with the method, the operating condition (e.g., the operating SNR) of the system is initially determined, and a specific transmission scheme is selected from among a number of possible transmission schemes based on the determined operating condition and the amount of channel state information available at the transmitter. Each of the transmission schemes may be designated for use for a respective range of operating SNRs. One or more data streams to be transmitted are then determined based on the selected transmission scheme. The one or more data streams are then processed based on the selected transmission scheme and the available CSI. For example, the data rate and the coding and modulation scheme to use for each data stream may be determined based on the CSI. In one embodiment, the partial-CSI transmission scheme is selected for use if the operating SNR is above a threshold SNR, and the beam-forming transmission scheme is selected for use if the operating SNR is below the threshold SNR Various aspects and embodiments of the invention are described in further detail below. The invention further provides methods, processors, transmitter units, receiver units, base stations, terminals, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
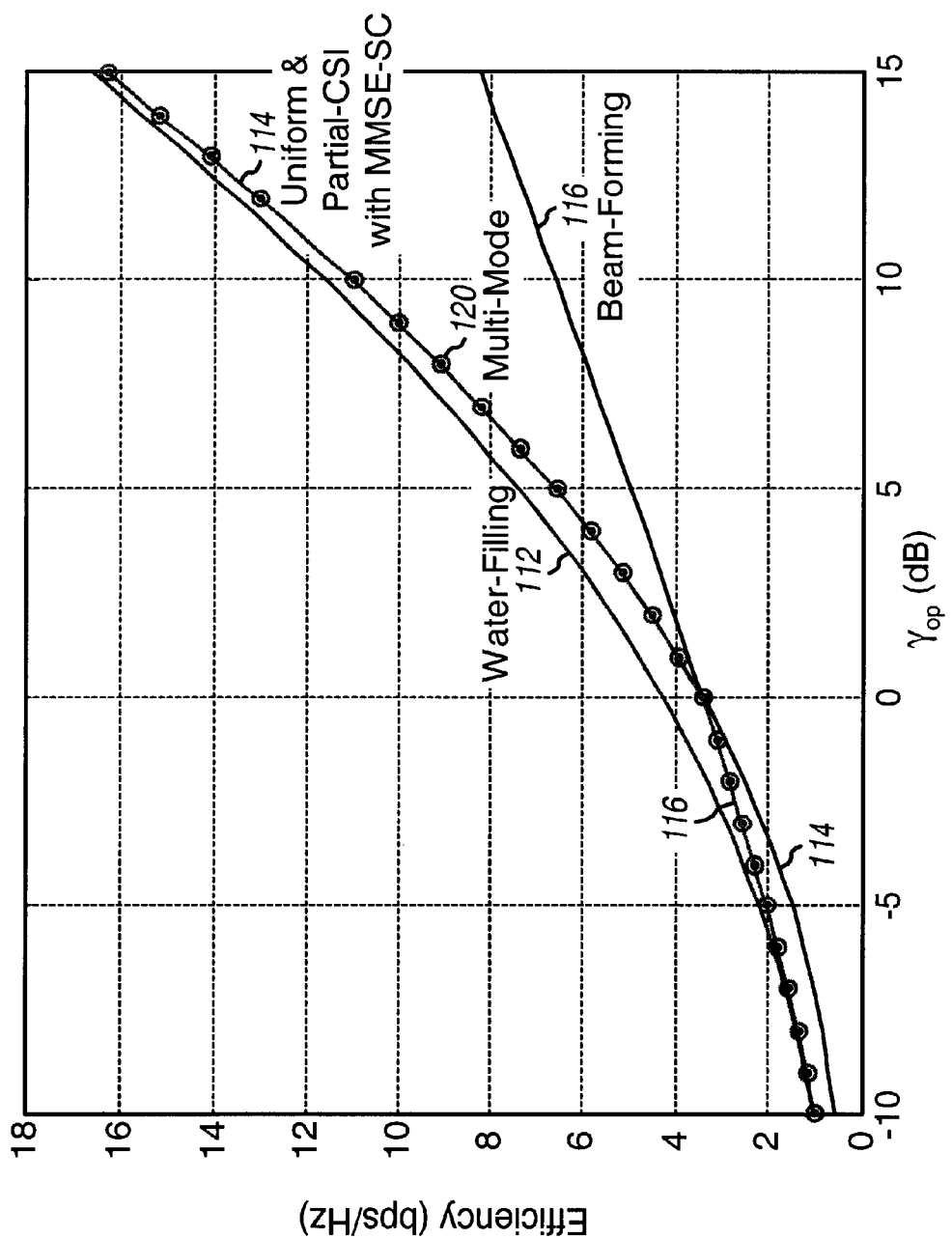
FIG. 1 shows three plots of the efficiencies achieved for a 4×4 MIMO system using the water-filling, partial-CSI with MMSE-SC, and beam-forming transmission schemes.

The data transmission techniques described herein may be used for various multi-channel communication systems. Such multi-channel communication systems include multiple-input multiple-output (MIMO) communication systems, orthogonal frequency division multiplexing (OFDM) communication systems, MIMO systems that utilize OFDM (i.e., MIMO-OFDM systems), and others. The multi-channel communication systems may also implement code division multiple access (CDMA), time division multiple access (TDMA), frequency division multiple access (FDMA), or some other multiple access techniques. Multiple access communication systems can support concurrent communication with a number of terminals (i.e., users). For clarity, certain aspects and embodiments of the invention are described specifically for a MIMO system such as a multiple-antenna wireless communication system.

A MIMO system employs multiple ($N_T$) transmit antennas and multiple ($N_R$) receive antennas for data transmission. A MIMO channel formed by the $N_T$ transmit and $N_R$ receive antennas is referred to as a $N_R \times N_T$ MIMO system, and may be decomposed into $N_S$ independent channels, with $N_S \leq \min\{N_T, N_R\}$. Each of the $N_S$ independent channels is also referred to as a spatial subchannel (or a transmission channel) of the MIMO channel. The number of spatial subchannels is determined by the number of eigenmodes for the MIMO channel, which in turn is dependent on a channel response matrix, H, that describes the response between the $N_T$ transmit and $N_R$ receive antennas.

The elements of the channel response matrix, H, are composed of independent Gaussian random variables, as follows:

$$H = \begin{bmatrix} h_{1,1} & h_{1,2} & \cdots & h_{1,N_T} \\ h_{2,1} & h_{2,2} & \cdots & h_{2,N_T} \\ \vdots & \vdots & & \vdots \\ h_{N_R,1} & h_{N_R,2} & \cdots & h_{N_R,N_T} \end{bmatrix}, \quad \text{Eq (1)}$$

where $h_{i,j}$ is the coupling (i.e., the complex gain) between the j-th transmit antenna and the i-th receive antenna.

The model for the MIMO system may be expressed as:

$$y = Hx + n \qquad \text{Eq (2)}$$

where y is the received vector, i.e., $y = [y_1 \, y_2 \, \ldots \, y_{N_R}]^T$, where $\{y_i\}$ is the entry received on the i-th received antenna and $i \in \{1, \ldots, N_R\}$;

x is the transmitted vector, i.e., $x = [x_1 \, x_2 \, \ldots \, x_{N_T}]^T$, where $\{x_j\}$ is the entry transmitted from the j-th transmit antenna and $j \in \{1, \ldots, N_T\}$;

H is the channel response matrix for the MIMO channel;

n is the additive white Gaussian noise (AWGN) with a mean vector of 0 and a covariance matrix of $\Lambda_n = \sigma^2 I$, where 0 is a vector of zeros, I is the identity matrix with ones along the diagonal and zeros everywhere else, and $\sigma^2$ is the variance of the noise; and $[.]^T$ denotes the transpose of $[.]$.

For simplicity, the MIMO channel is assumed to be a flat-fading channel. In this case, the elements of the channel response matrix, H, are scalars, and the coupling, $h_{i,j}$, between each transmit-receive antenna pair can be represented by a single scalar value. However, the techniques described herein may also be applied to a frequency selective channel having different channel gains at different frequencies. In such a frequency selective channel, the operating bandwidth may be divided into a number of (equal or unequal) frequency bands such that each band may be considered as a flat-fading channel. A particular transmission scheme may then be used for each of the frequency bands, subject to certain constraints such as maintaining the total transmit power used for all frequency bands of a given transmit antenna to within the peak transmit power of the antenna. In this way, the channel response of the individual frequency bands may be considered in the data transmission.

Due to scattering in the propagation environment, $N_s$ data streams transmitted from the $N_T$ transmit antennas interfere with each other at the receiver. Multiple data streams may be transmitted on the spatial subchannels using channel-state information (CSI), which is descriptive of the characteristics of the MIMO channel. CSI may be categorized as either "full CSI" or "partial CSI". Full CSI includes sufficient characterization (e.g., amplitude and phase) for the propagation path between each transmit-receive antenna pair in a ($N_R \times N_T$) MIMO matrix as well as relevant modulation/coding information for the data streams. Partial CSI may comprise, for example, the signal-to-noise-and-interference ratios (SNRs) of the data streams. The full or partial CSI may be determined at the receiver (e.g., based on the received pilot and/or traffic data) and reported to the transmitter.

Different transmission schemes may be used depending on whether full or partial CSI is available at the transmitter. When full CSI is available, the data streams may be transmitted on the eigenmodes of the MIMO channel. This may be achieved by pre-conditioning the data streams at the transmitter based on a set of (right) eigenvectors derived from the channel response matrix, H, as described below. At the receiver, the transmitted data streams may be recovered by multiplying the received symbol streams with a set of (left) eigenvectors, which are also derived based on the matrix H. The full-CSI (or eigenmode) transmission scheme is thus dependent on knowledge of the channel response matrix, H. The full-CSI transmission scheme and variants of this scheme are described in further detail below.

When only partial CSI is available, the data streams may be transmitted from the transmit antennas without pre-conditioning at the transmitter. At the receiver, the received symbol streams are processed in accordance with a particular spatial or space-time receiver processing technique to attempt to separate out the data streams. The partial-CSI transmission scheme is also described in further detail below.

For both the full and partial CSI transmission schemes, the data rate and the coding and modulation for each data stream are dependent on the SNR achieved for the data stream. The SNR of each data stream may be estimated at the receiver. Information descriptive of either the estimated SNR or the particular coding and modulation scheme to be used for each data stream may then be provided to the transmitter and used to process the data stream prior to transmission over the MIMO channel.

When full CSI is available, one technique for eliminating or reducing the interference among the data streams is to "diagonalize" the MIMO channel such that the data streams are effectively transmitted on orthogonal spatial subchannels. One technique for diagonalizing the MIMO channel is to perform singular value decomposition on the channel response matrix, H, which can be expressed as:

$$H = UDV^H \quad \text{Eq (3)}$$

where U is an $N_R \times N_R$ unitary matrix (i.e., $U^H U = I$);

D is an $N_R \times N_T$ matrix;

V is an $N_T \times N_T$ unitary matrix; and

"$H$" denotes the complex transpose of a matrix.

The diagonal entries of matrix D are the square roots of the eigenvalues of $G = H^H H$, denoted by $\lambda_i$ and $i \in \{1, \ldots, N_S\}$ where $N_S \leq \min\{N_T, N_R\}$ is the number of resolvable data streams. All non-diagonal entries of D are zero.

The diagonal matrix D thus contains non-negative real values along the diagonal and zeros elsewhere, where the non-negative real values are $d_i = \sqrt{\lambda_i}$. The $d_i$ are referred to as the singular values of the channel response matrix, H. The singular value decomposition is a matrix operation known in the art and described in various references. One such reference is a book by Gilbert Strang entitled "Linear Algebra and Its Applications," Second Edition, Academic Press, 1980, which is incorporated herein by reference.

The singular value decomposition decomposes the channel response matrix, H, into two unitary matrices, U and V, and the diagonal matrix, D. Matrix D is descriptive of the eigenmodes of the MIMO channel, which correspond to the spatial subchannels. The unitary matrices, U and V, include "steering" vectors (or left and right eigenvectors, respectively) for the receiver and transmitter, respectively, which may be used to diagonalize the MIMO channel. Specifically, to diagonalize the MIMO channel, a signal vector, s, may be pre-multiplied with the matrix, V, at the transmitter to provide the transmitted vector, x, as follows:

$$x = Vs \quad \text{Eq (4)}$$

This vector x is then transmitted over the MIMO channel to the receiver.

At the receiver, the received vector, y=Hx+n, may be pre-multiplied with the matrix, $U^H$, to obtain a recovered vector, r as follows:

$$\begin{aligned} \underline{r} &= \underline{U}^H \underline{H} \underline{V} \underline{s} + \underline{U}^H \underline{n} \\ &= \underline{D}\underline{s} + \underline{\hat{n}}, \end{aligned} \quad \text{Eq (5)}$$

where $\hat{n}$ is simply a rotation of n, resulting in additive white Gaussian noise with the same mean vector and covariance matrix as n.

As shown in equation (4), the pre-multiplication of the signal vector, s, by the matrix V and the pre-multiplication of the received vector, y, by the matrix $U^H$ result in an effective diagonal channel, D, which is the transfer function between the signal vector, s, and the recovered vector, r. As a result, the MIMO channel is decomposed into $N_S$ independent, non-interfering, orthogonal, and parallel channels. These independent channels are also referred to as the spatial subchannels of the MIMO channel. Spatial subchannel i or eigenmode i has a gain that is equal to the eigenvalue, $\lambda_i$, where $i \in I$ and set I is defined as $I = \{1, \ldots, N_s\}$. Diagonalization of the MIMO channel to obtain $N_S$ orthogonal spatial subchannels can be achieved if the transmitter is provided with an estimate of the channel response matrix, H.

For the full-CSI transmission scheme, one data stream may be transmitted on each of the $N_S$ spatial subchannels or eigenmodes. For each spatial subchannel to be used for data transmission, the transmitter is provided the (right) eigenvector as well as relevant modulation/coding information for that subchannel. Thus, if all $N_S$ spatial subchannels are used for data transmission, then the transmitter is provided with either the channel response matrix, H, or the unitary matrix, V, and the relevant modulation/coding information.

For the partial-CSI transmission scheme, one data stream may be transmitted on each of the $N_T$ transmit antennas (assuming that H is a full-rank matrix and $N_S = N_T = N_R$). For the partial-CSI transmission scheme, the transmitter needs not be provided with the channel response matrix, H, or the unitary matrix, V, since the data streams are not pre-conditioned prior to transmission over the MIMO channel.

For the partial-CSI transmission scheme, various receiver processing techniques may be used at the receiver to process the received symbol streams to separate out the transmitted data streams. These receiver processing techniques include spatial receiver processing techniques (which may be used for a non-dispersive channel with flat fading) and space-time receiver processing techniques (which may be used for a dispersive channel with frequency selective fading). The spatial receiver processing techniques include a channel correlation matrix inversion (CCMI) technique and a minimum mean square error (MMSE) technique. The space-time receiver processing techniques include an MMSE linear equalizer (MMSE-LE), a decision feedback equalizer (DFE), and a maximum-likelihood sequence estimator (MLSE). In general, these spatial and space-time receiver processing techniques require an estimate of the channel response at the receiver (but not the transmitter).

A "successive nulling/equalization and interference cancellation" receiver processing technique (which is also referred to as a "successive interference cancellation" or "successive cancellation" receiver processing technique) may also be used in conjunction with any of the spatial or space-time technique described above to provide improved performance. For example, successive interference cancellation may be used with MMSE (i.e., MMSE-SC) to process the received symbol streams at the receiver to recover the data streams.

The various receiver processing techniques are described in detail in U.S. patent application Ser. No. 09/993,087, entitled "Multiple-Access Multiple-Input Multiple-Output (MIMO) Communication System," filed Nov. 6, 2001; U.S. patent application Ser. No. 09/854,235, entitled "Method and Apparatus for Processing Data in a Multiple-Input Multiple-Output (MIMO) Communication System Utilizing Channel State Information," filed May 11, 2001; now U.S. Pat. No. 6,785,341; and U.S. patent application Ser. Nos. 09/816,481, now U.S. Pat. No. 6,771,706 and 09/956,449, both entitled "Method and Apparatus for Utilizing Channel State Information in a Wireless Communication System," respectively filed Mar. 23, 2001 and Sep. 18, 2001. These applications are all assigned to the assignee of the present application and incorporated herein by reference The full-CSI transmission scheme requires more information regarding the MIMO channel (e.g., the matrix H), which is typically derived at the receiver and reported back to the transmitter. Thus, there is higher overhead cost associated with implementing the full-CSI transmission scheme. The partial-CSI transmission scheme does not require this additional information.

In a typical MIMO system, a peak transmit power of $P_{max}$ may be imposed on each of the $N_T$ transmit antennas. In this case, the total transmit power, $P_{tot}$, available at the transmitter for all $N_T$ transmit antennas may be expressed as:

$$P_{tot} = N_T P_{max}. \quad \text{Eq (6)}$$

The total transmit power, $P_{tot}$, may be allocated to the data streams based on various schemes.

A number of transmission schemes may be derived based on the full-CSI transmission scheme, with each such transmission scheme being dependent (in part) on how the total transmit power is allocated to the eigenmodes. These transmission schemes include a "water-filling" transmission scheme, a "selective channel inversion" transmission scheme, a "uniform" transmission scheme, a "principal eigenmode beam-forming" (or simply, "beam-forming") transmission scheme, and a "beam-steering" transmission scheme. Fewer, additional, and/or different transmission schemes may also be considered and are within the scope of the invention. For the water-filling transmission scheme, the total transmit power is allocated such that more transmit power is allocated to transmission channels with less noise and less transmit power is allocated to more noisy channels. For the selective channel inversion transmission scheme, the total transmit power is non-uniformly allocated to selected ones of the transmission channels such that they achieve approximately similar post-detection SNRs. For the uniform transmission scheme, the total transmit power is allocated equally among the transmission channels. For the beam-forming transmission scheme, all transmit power is allocated to a single transmission channel having the best performance. And for the beam-steering transmission scheme, the total transmit power is uniformly allocated to all transmit antennas used for transmitting a single data stream, but the data stream is transmitted with the proper phases from these transmit antennas. These transmission schemes rely on full-CSI processing (or a variant thereof) at the transmitter for each transmission channel selected for use. These various full-CSI based transmission schemes are described in further detail below.

The water-filling transmission scheme allocates the total transmit power, $P_{tot}$, to the eigenmodes such that transmission capacity (i.e., spectral efficiency) is maximized. The water-filling power allocation is analogous to pouring a fixed amount of water into a vessel with an irregular bottom, where each eigenmode corresponds to a point on the bottom of the vessel, and the elevation of the bottom at any given point corresponds to the inverse of the signal-to-noise ratio (SNR) associated with that eigenmode. A low elevation thus corresponds to a high SNR and, conversely, a high elevation corresponds to a low SNR. The total transmit power, $P_{tot}$, is then "poured" into the vessel such that the lower points in the vessel (i.e., higher SNRs) are filled first, and the higher points (i.e., lower SNRs) are filled later. The power distribution is dependent on the total transmit power, $P_{tot}$, and the depth of the vessel over the bottom surface. The water surface level for the vessel after all of the total transmit power has been poured is constant over all points in the vessel. The points with elevations above the water surface level are not filled (i.e., eigenmodes with SNRs below a particular threshold are not used). The water-filling distribution is described by Robert G. Gallager, in "Information Theory and Reliable Communication," John Wiley and Sons, 1968, which is incorporated herein by reference.

Capacity is defined as the highest spectral efficiency at which information can be communicated with an arbitrarily low probability of error, and is typically given in unit of bits per second per Hertz (bps/Hz). The capacity for one Gaussian channel with an SNR of γ may be expressed as:

$$C = \log_2(1+\gamma). \quad \text{Eq (7)}$$

For a MIMO system with limited total transmit power of $P_{tot}$, the water-filling transmission scheme can optimally allocate the total transmit power to the $N_S$ spatial subchannels such that capacity is achieved. The water-filling transmission scheme distributes the total transmit power, $P_{tot}$, over the eigenmodes in such a way that the eigenmode with the lowest noise variance (i.e., the highest SNR) receives the greatest fraction of the total power. The amount of power allocated to eigenmode i as a result of water filling is denoted by $P_i$, for $i \in I$, where $$P_{tot} = \sum_{i \in I} P_i. \quad \text{Eq (8)}$$

Based on the allocated transmit power of $P_i$ for eigenmode i, for $i \in I$, the effective SNR for eigenmode i, $\gamma_i$, may be expressed as:

$$\gamma_i = \frac{P_i \cdot \lambda_i}{\sigma^2}, \quad \text{Eq (9)}$$

where $\lambda_i$ is the channel gain on sub-channel i and $\sigma^2$ is the noise variance for the MIMO channel, assuming the same noise variance over all sub-channels. The capacity achieved by the water-filling transmission scheme for the $N_S$ spatial subchannels may then be expressed as:

$$C = \sum_{i=1}^{N_S} \log_2(1 + \gamma_i). \qquad \text{Eq (10)}$$

The spectral efficiency of each eigenmode may be determined based on a particular monotonically increasing function in SNR. One function that may be used for spectral efficiency is the capacity function shown in equation (7). In this case, the spectral efficiency for eigenmode i, $\rho_i$, may be expressed as:

$$\rho_i = \log_2(1+\gamma_i). \qquad \text{Eq (11)}$$

The total spectral efficiency of the system is the summation of the spectral efficiencies of all eigenmodes, each of which may be determined as shown in equation (11).

A specific algorithm for performing water-filling power allocation for a MIMO-OFDM system is described in U.S. patent application Ser. No. 09/978,337, entitled "Method and Apparatus for Determining Power Allocation in a MIMO Communication System," filed Oct. 15, 2001. A specific algorithm for performing water-filling power allocation for a MIMO system is described in U.S. patent application Ser. No. 10/056,275, entitled "Reallocation of Excess Power in a Multi-Channel Communication System", filed Jan. 23, 2002. Both of these applications are assigned to the assignee of the present application and incorporated herein by reference.

The selective channel inversion transmission scheme allocates the total transmit power, $P_{tot}$, non-uniformly over selected ones of the $N_S$ eigenmodes such that the post-detection SNRs of the data streams transmitted on these selected eigenmodes are approximately similar. For this transmission scheme, poor eigenmodes are not selected for use. The similar post-detection SNRs allow the same coding and modulation scheme to be used for all data streams, which can simplify the processing at both the transmitter and receiver.

Techniques for allocating transmit power to achieve similar post-detection SNRs are described in U.S. patent application Ser. No. 09/860,274, filed May 17, 2001, Ser. No. 09/881,610, filed Jun. 14, 2001, and Ser. No. 09/892,379, and now U.S. Pat. No. 6,751,187, filed Jun. 26, 2001, all three entitled "Method and Apparatus for Processing Data for Transmission in a Multi-Channel Communication System Using Selective Channel Inversion," assigned to the assignee of the present application and incorporated herein by reference.

The uniform transmission scheme allocates the total transmit power, $P_{tot}$, equally over all $N_S$ eigenmodes. This can be achieved by allocating $P_{tot}/N_S$ to each eigenmode. Based on the allocated transmit power of $P_{tot}/N_S$ for eigenmode i, for $i \in I$, the effective SNR for eigenmode i, $\hat{\gamma}_i$, may be expressed as:

$$\hat{\gamma}_i = \frac{P_{tot} \cdot \lambda_i}{N_S \cdot \sigma^2}. \qquad \text{Eq (12)}$$

The spectral efficiency achieved by the uniform transmission scheme for the $N_S$ spatial subchannels may then be expressed as:

$$\hat{C} = \sum_{i=1}^{N_S} \log_2(1 + \hat{\gamma}_i). \qquad \text{Eq (13)}$$

The beam-forming transmission scheme allocates the total transmit power, $P_{tot}$, to a single eigenmode. In order to approach capacity, the total transmit power is allocated to the eigenmode corresponding to the highest eigenvalue, $\lambda_{max}$. This then maximizes the SNR given the constraint of using a single eigenmode for data transmission. The effective SNR for the single (best) eigenmode may be expressed as:

$$\tilde{\gamma} = \frac{P_{tot} \cdot \lambda_{max}}{\sigma^2}. \qquad \text{Eq (14)}$$

The eigenvalues, $\lambda_i$, for $i \in I$, may be ordered in decreasing order. In this case, $\lambda_1$ is then the highest eigenvalue (i.e., $\lambda_1 = \lambda_{max}$).

The spectral efficiency achieved by the beam-forming transmission scheme for the $N_S$ spatial subchannels may be expressed as:

$$\tilde{C} = \log_2(1+\tilde{\gamma}). \qquad \text{Eq (15)}$$

Since only one eigenmode is used for data transmission, equation (15) does not include a summation over the $N_S$ spatial subchannels, as is the case for equations (10) and (13) for the water-filling and uniform transmission schemes, respectively.

Although the beam-forming transmission scheme is based on full-CSI processing at the transmitter, less channel state information is required to implement this transmission scheme since only one eigenmode is used for data transmission. In particular, only one singular vector corresponding to the selected eigenmode needs to be provided to the transmitter, which then uses this vector to pre-condition the data stream prior to transmission over the MIMO channel. This singular vector may be derived at the receiver based on the channel response matrix, H, and provided to the transmitter.

The beam-steering transmission scheme allocates the total transmit power, $P_{tot}$, uniformly to all transmit antennas used for transmitting a single data stream. At low SNRs, the water-filling transmission scheme tends to allocate a large portion of the total transmit power to a principal eigenmode, which is the eigenmode corresponding to the highest eigenvalue, $\lambda_{max}$. For the beam-forming transmission scheme, a single data stream is transmitted on the principal eigenmode, and this data stream is scaled by a complex gain value associated with each transmit antenna used for data transmission, as determined by the singular vector corresponding to the principal eigenmode. The magnitude of the complex gain value determines the amount of transmit power to be used for the transmit antenna.

The beam-steering transmission scheme is similar to the beam-forming transmission scheme and transmits a single data stream over the MIMO channel. However, since only one data stream is transmitted, it is not necessary to orthogonalize the transmission channels or to restrict the transmission of this data stream on a single transmission channel corresponding to the principal eigenmode. The beam-steering transmission scheme relies on the principal eigenmode, which achieves the best performance, but allocates the total transmit power uniformly to all transmit antennas used for data transmission. In this way, higher transmit power is utilized for the data stream, which may result in improved performance.

For the beam-steering transmission scheme, the eigenmode corresponding to the highest eigenvalue, $\lambda_{max}$, is initially identified (e.g., at the receiver), and the singular vector corresponding to this eigenmode is determined. This singular vector includes $N_T$ complex values for the complex gains to be used for the $N_T$ transmit antenna. The beam-steering transmission scheme transmits the single data stream from the $N_T$ transmit antennas at full power but with the proper phases, which are the phases of the $N_T$ complex gain values in the singular vector. Thus, only the phases of the $N_T$ elements in the singular vector need to be provided to the transmitter. The data stream is then transmitted from the $N_T$ transmit antennas at normalized (e.g., full) transmit power but with the phases for the principal eigenmode. This then allows the transmissions from the $N_T$ transmit antennas to be constructively (or coherently) combined at the receiver, which can provide improved performance.

A number of transmission schemes may also be derived based on the partial-CSI transmission scheme. In one scheme, the peak transmit power, $P_{max}$, is used for each data stream, and $N_T$ data streams are transmitted from the $N_T$ transmit antennas using partial-CSI processing (i.e., no pre-conditioning at the transmitter). In another scheme (which may be referred to as the "selective partial-CSI scheme"), only selected ones of the $N_T$ transmit antennas are used for data transmission, and one data stream is transmitted from each selected transmit antenna (e.g., using peak transmit power). Other variants of the partial-CSI transmission scheme may also be formed.

A number of transmission schemes may thus be used for data transmission. Each transmission scheme is dependent on whether the full or partial CSI is available at the transmitter.

FIG. 1 shows three plots of the efficiencies achieved for an example 4×4 MIMO system using the water-filling, uniform, and beam-forming transmission schemes described above. The efficiencies are determined based on an assumption of an uncorrelated, complex Gaussian channel model whereby the MIMO channel experiences additive white Gaussian noise (AWGN) but no other interference.

For the water-filling transmission scheme, a large number of random channel sets (i.e., sets of spatial subchannels with random eigenvalues) are initially generated. These channel sets are then evaluated for various discrete values of noise variance $\sigma^2$, where each noise variance value corresponds to a particular "operating" SNR, as described below. For each channel set, water-filling is used to allocate the total transmit power to the spatial subchannels in the set based on the subchannels' eigenvalues and for various noise variance values. The effective SNRs of the spatial subchannels in each set are dependent on the subchannels' eigenvalues, the allocated transmit power, and the noise variance, and may be determined as shown in equation (9). The efficiency of each channel set is then determined for each noise variance value, as shown in equation (10). A statistical average of the efficiency of all channel sets is then obtained for each noise variance value.

For the beam-forming transmission scheme, the same randomly-generated channel sets are evaluated, except that only the eigenmode corresponding to the highest eigenvalue is selected for use. Each channel set is similarly evaluated for various discrete values of noise variance $\sigma^2$, and a statistical average of the efficiency of these channel sets is obtained for each noise variance value. For the uniform transmission scheme, the total transmit power is uniformly allocated to the eigenmodes in each randomly-generated channel set. Each set is also evaluated for various discrete noise variance values, and the statistical average of the efficiency of the channel sets is obtained for each noise variance value.

As shown in FIG. 1, the efficiency achieved by each transmission scheme is plotted versus operating SNR. The operating SNR is the inverse of the power of the additive white Gaussian noise at the receiver and is defined as:

$$\gamma_{op} = \frac{1}{\sigma^2}. \qquad \text{Eq (16)}$$

The operating SNR is a measure of the operating condition of the MIMO channel. As shown in equation (16), the operating SNR and the noise variance $\sigma^2$ are inversely related. The efficiencies obtained for various noise variance values for each transmission scheme may thus be plotted versus operating SNR instead of noise variance for ease of understanding. As shown in FIG. 1, the spectral efficiency of the water-filling transmission scheme shown by plot 112 is the best of the three transmission schemes and can be shown to be equal to capacity. The efficiencies for the uniform and beam-forming transmission schemes are shown by plots 114 and 116, respectively. At low SNRs, the beam-forming transmission scheme is close to optimum (i.e., the water-filling transmission scheme) because only one eigenmode is often active at these SNRs. At high SNRs, the uniform transmission scheme approaches the optimum performance of the water-filling transmission scheme.

The efficiency for the uniform transmission scheme shown by plot 114 is achieved using full-CSI processing at the transmitter. In particular, equation (13) indicates that the efficiency, $\hat{C}$, may be achieved based on the effective SNRs of $\hat{\gamma}_i$ for the spatial subchannels, and equation (12) suggests full CSI (e.g., the channel response matrix, H) is needed to derive the eigenvalues, $\lambda_i$, which are then used to determine the effective SNRs. However, it can be shown that the efficiency, $\hat{C}$, can also be obtained for the partial-CSI transmission scheme if the MMSE-SC receiver processing technique is used at the receiver to process and recover the transmitted data streams. If some other receiver processing technique is used at the receiver instead of the MMSE-SC technique, then the efficiency for the partial-CSI transmission scheme may be less than that shown in equation (13).

To achieve the optimum efficiency of the water-filling transmission scheme, the transmitter needs full knowledge of the MIMO channel, i.e., full CSI. Full CSI may be provided by the channel response matrix, H, and the noise variance, $\sigma^2$. The channel response matrix, H, may then be evaluated (e.g., using singular value decomposition) to determine the eigenmodes and eigenvalues of the matrix $G=H^H H$. The total transmit power may then be allocated to the eigenmodes based on the eigenvalues and the noise variance using the water-filling transmission scheme.

The water-filling transmission scheme may not be preferred or available for some MIMO systems due to various factors. First, full CSI may be difficult to obtain (e.g., typically at the receiver) because this would require measurement of the channel gain between each transmit-receive antenna pair. Second, additional air-link resources would be required to report the full CSI for all eigenmodes from the receiver back to the transmitter. Third, higher accuracy (i.e., more bits) may be required to represent the channel gains since any error translates to a corresponding loss in orthogonality. Fourth, the channel gains are more sensitive to measurement and reporting delays if the MIMO channel is time-varying. These factors may curtail the use of the water-filling transmission scheme for some MIMO systems.

In an aspect, multiple transmission schemes having seemingly sub-optimal efficiencies, but which require less CSI to implement, are selectively used to provide overall efficiency near or approaching optimum. These sub-optimal transmission schemes may include, for example, the partial-CSI transmission scheme (e.g., with MMSE-SC receiver processing) and the beam-forming transmission scheme (or the beam-steering transmission scheme) described above. Different and/or additional transmission schemes may also be used, and this is within the scope of the invention.

The "near-optimum" overall performance may be attained for the sub-optimal transmission schemes by providing the transmitter with necessary CSI. This CSI may comprise "post-processed" SNRs of the data transmissions on the $N_S$ eigenmodes, as determined at the receiver after performing spatial receiver processing, as described below. The post-processed SNRs may be used by the transmitter to select (1) the particular transmission scheme from among multiple possible transmission schemes to use for data transmission, and (2) the data rate and the coding and modulation scheme to use for each data stream.

For the beam-forming transmission scheme, a singular vector, v, of scalar values associated with the selected eigenmode (e.g., corresponding to the highest eigenvalue, $\lambda_{max}$) is also provided to the transmitter and used to beam-form the data transmission on this eigenmode. The receiver can pre-multiply the received vector, y, with a corresponding singular vector, u, to recover the transmitted data stream.

To achieve high performance using only partial CSI, the receiver may employ the MMSE-SC receiver processing technique, which can yield the spectral efficiency achieved by the uniform transmission scheme, which requires full CSI.

As SNR is reduced, the water-filling transmission scheme tends to allocate a greater fraction of the total transmit power to the principal eigenmode having better performance. At some threshold SNR, $\gamma_{th}$, a good strategy is to allocate the total transmit power to the eigenmode corresponding to the maximum eigenvalue. As shown in FIG. 1, the performance of the beam-forming transmission scheme (plot 116) approaches the optimum efficiency of the water-filling transmission scheme (plot 112) at increasingly lower SNRs. Conversely, as SNR is increased, the difference in power per eigenmode allocated by the water-filling transmission scheme relative to the total power decreases, and the power allocation appears more uniform. As SNR increases, the noise variance, $\sigma^2$, decreases, and the elevations of the different eigenmodes (which are determined as $\sigma^2/\lambda_i$) go down lower. As also shown in FIG. 1, the performance of the uniform transmission scheme and the partial-CSI with MMSE-SC scheme (plot 114) approaches the efficiency of the water-filling transmission scheme at increasingly higher SNRs.

The partial-CSI transmission scheme, with MMSE-SC (or an equivalent scheme) at the receiver, can achieve the spectral efficiency of the uniform transmission scheme under certain conditions, but without the extra "cost" associated with full CSI required by the uniform transmission scheme. As seen in FIG, 1, the spectral efficiency of the partial-CSI with MMSE-SC scheme decreases substantially at low SNRs.

In an aspect, a MIMO system may advantageously employ multiple transmission schemes (e.g., the partial-CSI with MMSE-SC scheme and the beam-forming or beam-steering transmission scheme) to provide improved performance over a wider range of SNRs. Each transmission scheme used by the MIMO system may correspond to a respective mode of operation. The "multi-mode" MIMO system may then switch between the various supported modes of operation (e.g., the partial CSI and beam-forming modes) depending on the channel (or operating) conditions. In this way, the transmission scheme that provides the best performance for a given operating condition may be selected for use to provide high performance.

FIG. 1 also shows a plot 120 (represented by the circled dots) for the efficiency achieved by a multi-mode MIMO system that employs both the partial-CSI (with MMSE-SC) and beam-forming transmission schemes. The spectral efficiency, $C_{mm}$, achieved by this multi-mode system at any operating SNR may be expressed as:

$$C_{mm} = \max(\hat{C}, \tilde{C}), \qquad \text{Eq (17)}$$

where $\hat{C}$ and $\tilde{C}$ are the spectral efficiencies for the partial-CSI employing MMSE-SC and the beam-forming transmission schemes given by equations (13) and (15), respectively. The maximum loss in efficiency encountered by the use of these two transmission schemes occurs near an operating SNR of $\gamma_{op}=0$ dB, and is approximately 1.75 dB, for this example MIMO system employing four transmit and four receive antennas. With the implementation of this multi-mode system, the loss in efficiency reduces at both low and high SNRs. As shown in FIG. 1, the beam-forming transmission scheme may be used to provide extended range of operation (i.e., covering low SNRs) for the MIMO system. The performance for the partial-CSI with MMSE-SC and beam-forming transmission schemes assumes an uncorrelated channel model. As the channel gets more correlated, fewer data streams can be resolved at the receiver. Consequently, the intersection of partial-CSI with MMSE-SC and beam-forming transmission schemes shifts to a higher SNR, and the beam-forming transmission scheme becomes the chosen mode of operation for a greater range of SNRs at the low end.

Some of the transmission schemes described above (e.g., the beam-steering transmission scheme) may also be employed by the system. Other transmission schemes may also be used, and this is within the scope of the invention. For example, a "selective eigenmode" transmission scheme may be used to uniformly allocate the total transmit power among a subset of the $N_S$ eigenmodes. This scheme may be selected for use, for example, if two or more eigenmodes achieve effective SNRs above some threshold SNR. A "selective partial-CSI" transmission scheme may also be used whereby only some of the transmit antennas are used for data transmission and the remaining transmit antennas would then be turned off.

Variations to the transmission schemes described herein may also be implemented, and this is within the scope of the invention. For example, a transmit diversity scheme may be used whereby a single data stream is transmitted over all $N_T$ transmit antennas at full power without any beam-forming. For the partial CSI with MMSE-SC scheme, which yields the same spectral efficiency as the uniform transmission scheme under certain conditions, the actual transmit power used for a given data stream may be adjusted to be the minimum amount needed for a given (quantized) data rate.

In general, any number and type of transmission schemes may be employed by a multi-mode MIMO system to provide improved overall performance. Each transmission scheme may provide good or near-optimum performance over some operating conditions (e.g., a specific range of SNRs). These multiple transmission schemes may then be combined in a piece-wise fashion to form a multi-mode transmission scheme that covers all operating conditions (e.g., the full range of SNRs) supported by the MIMO system.

FIG. 1 shows the spectral efficiency achieved by each of the three (water-filling, uniform, and beam-forming) transmission schemes, which is generally true on average. However, the spectral efficiencies shown in FIG. 1 do not take into account losses related to quantization of the singular vector, correlation in the channel, and other factors.

In general, the spectral efficiency achieved by each transmission scheme at any given time instant is a function of the operating SNR as well as the channel at that instant. Thus, to achieve high performance, the channel (and other factors) may be taken into account when selecting which transmission scheme to use. For slowly-varying channels, the instantaneous channel estimate may be used to evaluate the possible transmission schemes. For faster-varying channels, a time average of the channel may be obtained and used as the channel estimate.

The specific transmission scheme to be used for data transmission at any given time instance may be selected in various ways. The transmission scheme selection may be dependent on the specific operating conditions experienced by the system at that time instant and may further take into account other factors. Several methods for selecting transmission scheme are described below.

In one method for selecting transmission scheme, the specific transmission scheme to use for data transmission is selected based solely on the operating SNR. This method is simple to implement and may provide the desired level of performance.

In another method for selecting transmission scheme, the receiver evaluates each of the possible transmission schemes, and selects the transmission scheme that yields the highest spectral efficiency. For a system that only supports the beam-forming and partial-CSI transmission schemes, the receiver can evaluate the performance achieved for the beam-forming transmission scheme (using a quantized singular vector) and the partial-CSI with MMSE-SC (or some other receiver processing) scheme. The receiver can then select the transmission scheme that yields the highest throughput and provide this information to the transmitter.

In yet another method for selecting transmission scheme, the receiver evaluates each of the possible transmission schemes, and selects one of the transmission schemes based on the achievable spectral efficiency and other considerations. For example, the receiver can evaluate the performance achieved for the beam-forming and uniform transmission schemes. If the ratio of the spectral efficiencies (e.g., beam-forming spectral efficiency/uniform spectral efficiency) is greater than some threshold value, then the beam-forming transmission scheme may be selected for use. Otherwise, the partial-CSI transmission scheme may be selected. The uniform transmission scheme is typically "easier" (less computationally expensive, faster) to evaluate than the partial-CSI with MMSE-SC scheme, and may be used as a substitute (the receiver can evaluate the performance of the uniform transmission scheme since it may be able to obtain the full CSI). However, due to some implementation losses, the spectral efficiency of the uniform transmission scheme may not be exactly equal to that of the partial-CSI with MMSE-SC scheme. Furthermore, there is quantization loss associated with the beam-forming transmission scheme. Thus, the threshold value may be selected to take these various factors into account.

Other methods for selecting the specific transmission scheme to use at any given time instant may also be devised, and this is within the scope of the invention. In general, any number of the possible transmission schemes (or their equivalents) may be evaluated, and the specific transmission scheme to be used for data transmission may be selected based on various factors such as (1) the achievable spectral efficiency, (2) the estimated implementation losses, and so on.

Figure 2:
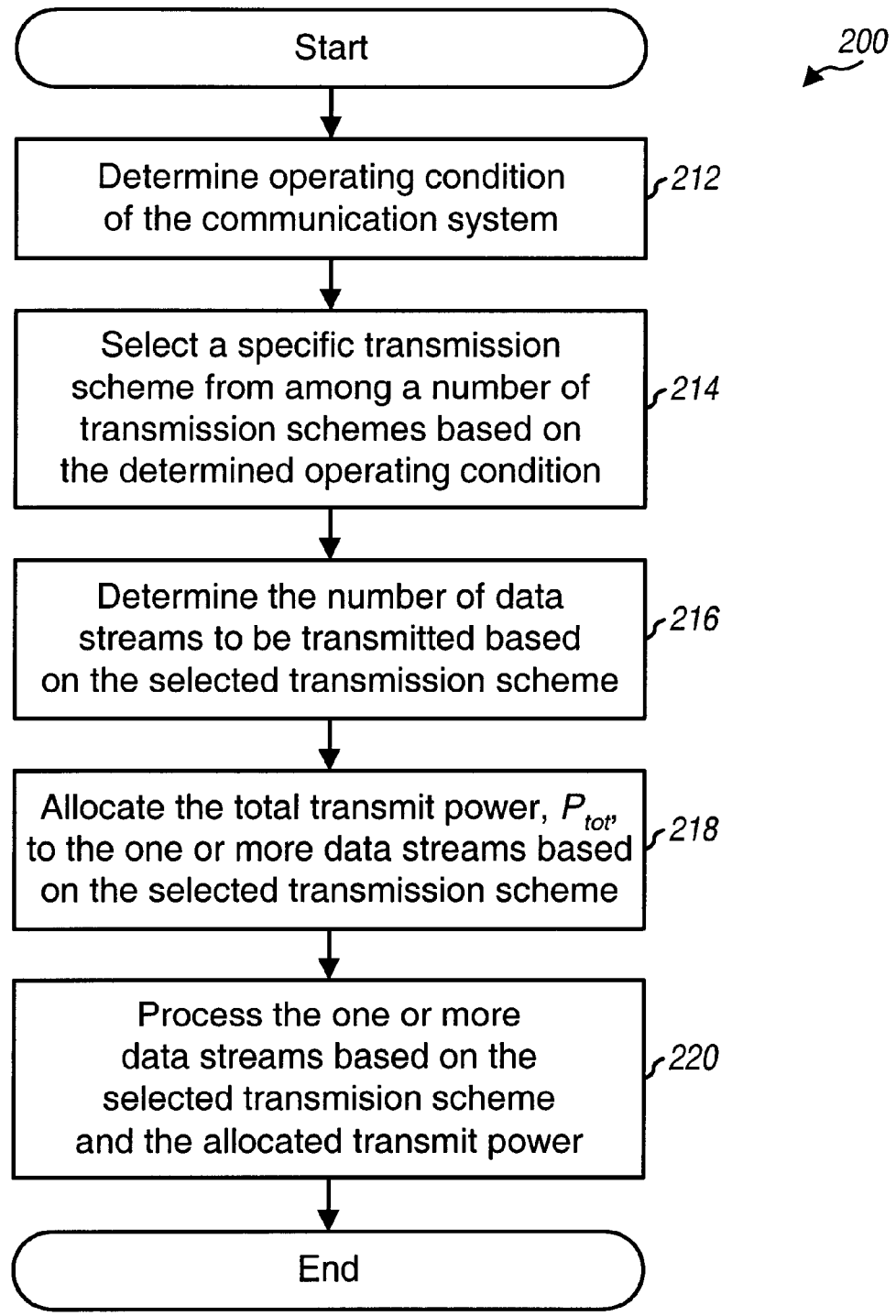
FIG. 2 is a flow diagram of an embodiment of a process for transmitting data on the available transmission channels in a MIMO system based on a multi-mode transmission scheme.

FIG. 2 is a flow diagram of an embodiment of a process 200 for transmitting data in a MIMO system based on a multi-mode transmission scheme. Initially, the operating condition of the MIMO system is determined (step 212). The operating condition may be quantified by the operating SNR, which may be determined based on the noise variance, as shown in equation (16), and/or other factors. The operating condition may be estimated based on a pilot transmitted along with the data, as is known in the art.

A specific transmission scheme is then selected from among multiple transmission schemes based on the determined operating condition (step 214). As noted above, any number of transmission schemes may be supported by the MIMO system. The specific transmission scheme to use for data transmission may be determined by comparing the operating SNR against one or more threshold SNRs. If the MIMO system supports only the partial-CSI and beam-forming transmission schemes, then the partial-CSI scheme may be selected if the operating SNR is equal to or greater than the threshold SNR, $\gamma_{th}$, and the beam-forming transmission scheme may be selected if the operating SNR is less than the threshold SNR.

The number of data streams to be transmitted is then determined, with the number being dependent on the selected transmission scheme (step 216). For example, a single data stream may be transmitted on a single eigenmode corresponding to the highest eigenvalue for the beam-forming transmission scheme, and $N_T$ data streams may be transmitted on $N_T$ transmit antennas for the partial-CSI transmission scheme. The total transmit power, $P_{tot}$, available to the system is then allocated to the one or more data streams based on the selected transmission scheme (step 218). The one or more data streams are then processed based on the selected transmission scheme and in accordance with the allocated transmit power and available CSI (step 220). The process shown in FIG. 2 may be performed at each transmission interval, which may correspond to a scheduling interval.

The transmission techniques described herein may also be used for other multi-channel communication systems, such as OFDM systems, MIMO-OFDM systems, and so on.

An OFDM system effectively partitions the system bandwidth into a number of ($N_F$) frequency subchannels, which are also commonly referred to as frequency bins or subbands. Each frequency subchannel is associated with a respective subcarrier (or frequency tone) upon which data may be modulated. At each time slot, which is a particular time interval that may be dependent on the bandwidth of a frequency subchannel, a modulation symbol may be transmitted on each of the $N_F$ frequency subchannels. For the OFDM system, each frequency subchannel may be referred to as a transmission channel, and there are $N_C = N_F$ transmission channels for the OFDM system.

The frequency subchannels of the OFDM system may experience frequency selective fading (i.e., different amounts of attenuation for different frequency subchannels). The specific response for the frequency subchannels is dependent on the characteristics (e.g., the fading and multipath effects) of the propagation path between the transmit and receive antennas. Consequently, different effective SNRs may be achieved for different frequency subchannels for a given amount of transmit power. In this case, a particular transmission scheme may be selected for use for the $N_F$ frequency subchannels in similar manner as that described above for the eigenmodes.

A MIMO-OFDM system includes $N_F$ frequency subchannels for each of the $N_S$ eigenmodes. Each frequency subchannel of each eigenmode may be referred to as a transmission channel, and there are $N_C = N_F \cdot N_S$ transmission channels for the MIMO-OFDM system. The frequency subchannels of each eigenmode in the MIMO-OFDM system may similarly experience different channel conditions and may achieve different SNRs for a given amount of transmit power. In this case, a particular transmission scheme may be selected for use for each of the $N_F$ frequency subchannels in similar manner as that described above for the eigenmodes. However, since each transmit antenna is limited by a peak transmit power of $P_{max}$, the total transmit power used for all frequency subchannels of a given transmit antenna is limited to $P_{max}$.

For a MIMO-OFDM system, all transmission channels (i.e., for both the spatial and frequency dimensions) may be considered in determining the specific transmission scheme to use for data transmission. Alternatively, the transmission scheme selection may be performed such that the transmission channels for only one dimension are considered at any given time.

The techniques described herein may also be used for groups of transmission channels. Each group may include any number of transmission channels and may be associated with a respective operating point. Each group may include, for example, the transmission channels to be used for an independent data stream, which may be associated with a particular data rate and a particular coding and modulation scheme. For a multiple-access communication system, each group may be associated with the transmission channels to be assigned to a different receiver.

For a wideband MIMO system that may experience frequency selective fading, the operating bandwidth may be divided into a number of (equal or unequal) frequency bands such that each band may be considered as a flat-fading channel. In that case, each element of the channel response matrix, H, behaves as a linear transfer function instead of a scalar, and the coupling, $h_{i,j}$, between each transmit-receive antenna pair may be represented by a vector of $N_F$ scalar values, one scalar value for each frequency band. Various transmission schemes may be used for a wideband MIMO system, some of which are described below.

In a first transmission scheme for the wideband MIMO system, beam-forming is used for each of the frequency bands. In one implementation of this first transmission scheme, the maximum eigenvalue is initially determined for each frequency band, and the eigenmode corresponding to this eigenvalue is selected for use. The "optimal" power allocation for these eigenmodes may then be determined based on the total transmit power, $P_{tot}$, available at the transmitter for all $N_T$ transmit antennas. This power allocation may be achieved using water-filling, as described in the aforementioned U.S. patent application Ser. No. 09/978,337. $N_F$ data streams may then be processed and transmitted on $N_F$ selected eigenmodes of $N_F$ frequency bands.

Depending on the channel response matrix, H, and the noise variance, $\sigma^2$, each of the data streams transmitted on the $N_F$ selected eigenmodes may achieve different post-detection SNR. In one embodiment, each data stream is coded and modulated based on a respective coding and modulation scheme selected for that data stream based on its post-detection SNR. In another embodiment, the total transmit power, $P_{tot}$, is allocated such that approximately similar post-detection SNRs are achieved for all data streams. For this embodiment, one common coding and modulation scheme may be used for all data streams, which can simplify the processing at both the transmitter and receiver.

Techniques for allocating transmit power to achieve similar post-detection SNRs are described in the aforementioned U.S. patent application Ser. Nos. 09/860,274, 09/881,610, and 09/892,379, now U.S. Pat. No. 6,751,187. The aforementioned U.S. patent application Ser. Nos. were filed on May 17, 2001, Jun. 14, 2001, and Jun. 26, 2001, repectively. Techniques for processing data at both the transmitter and receiver for a wideband MIMO system are described in the aforementioned U.S. patent application Ser. No. 09/993,087, filed Nov. 6, 2001, and in Ser. No. 10/017,388 and now U.S. Pat. No. 6,760,388 entitled "Time-Domain Transmit and Receive Processing with Channel Eigen-mode Decomposition with MIMO Systems," filed Dec. 7, 2001. These applications are all assigned to the assignee of the present application and incorporated herein by reference.

In a second transmission scheme for the wideband MIMO system, the partial-CSI transmission scheme is used for each of the frequency bands. In one implementation of this second transmission scheme, the peak transmit power, $P_{max}$, for each transmit antenna is divided equally among the $N_F$ frequency bands. $N_S$ data streams may then be processed and transmitted on each of the $N_F$ frequency bands. In one embodiment, each data stream may be coded and modulated based on its achieved post-detection SNR. In another embodiment, to simplify the coding and modulation at both the transmitter and receiver, the transmit power may be allocated non-uniformly such that a common coding and modulation scheme may be used for (1) all $N_S$ data streams for each frequency band, (2) all $N_F$ data streams for each spatial subchannel, (3) all data streams for all $N_S \cdot N_F$ transmission channels, or (4) all data streams for each group of transmission channels, which may include any combination of frequency/spatial subchannels.

For each transmission scheme selected for use in the wideband MIMO system, the transmitter is provided with the information necessary to properly process data prior to transmission. For example, for the first transmission scheme, which employs beam-forming for each of the $N_F$ frequency bands, the transmitter may be provided with (1) $N_F$ singular vectors for these $N_F$ frequency bands and (2) information indicative of the post-detection SNR for each of the $N_F$ selected eigenmodes or the coding and modulation scheme to be used for each data stream. For the second transmission scheme, which employs partial CSI transmission for each of the $N_F$ frequency bands, the transmitter may be provided with (1) the post-detection SNR for each data stream or each group of data streams.

Other transmission schemes that may be based on full-CSI or partial-CSI processing may also be used for the wideband MIMO system, and this is within the scope of the invention. These various transmission schemes allow the wideband MIMO system to consider the channel response of the individual frequency bands for the data transmission.

In one embodiment, one full-CSI or partial-CSI based transmission scheme is selected for use for all frequency bands of the wideband MIMO system, as described above for the first and second transmission schemes. This may simplify the processing at both the transmitter and receiver. In another embodiment, each frequency band may be treated independently, and a different full-CSI or partial-CSI based transmission scheme may be selected for use for each frequency band, subject to certain constraints such as maintaining the total transmit power used for all frequency bands of a given transmit antenna to within the peak transmit power, $P_{max}$.

For the wideband MIMO system, an equalizer may be employed at the receiver and used to equalize the frequency selective fading in the channel response. In this case, the transmission schemes available for the narrowband MIMO system may be used for the wideband MIMO system.

In general, it is desirable to simplify the processing at both the transmitter and receiver. This can be achieved by using as few coding and modulation schemes as possible (e.g., one coding and modulation scheme) for data transmission. One method for achieving this is to allocate the transmit power non-uniformly using selective channel inversion such that similar post-detection SNRs are achieved for the transmission channels. An independent data stream may then be processed (e.g., based on a common coding and modulation scheme) and transmitted on each of these transmission channels. Alternatively, one data stream may be processed (e.g., based on the common coding and modulation scheme) and demultiplexed and transmitted over these multiple transmission channels. For example, selective channel inversion may be applied in conjunction with the first transmission scheme described above, and one data stream may be processed and transmitted over the $N_F$ selected eigenmodes of the $N_F$ frequency bands.

Quantization of Channel State Information

The use of transmission schemes that rely on reduced amount of CSI (e.g., post-processed SNRs and singular vector) instead of full CSI (e.g., the channel response matrix) can greatly reduce the amount of channel information needed to be reported from the receiver to the transmitter. A transmission scheme that relies on full CSI would require $N_R \cdot N_T$ complex channel gains plus the noise variance, or the equivalent information, to be reported to the transmitter. In contrast, the partial-CSI transmission scheme only requires $N_S$ SNR values, where $N_S \leq \min \{N_T, N_R\}$. Each SNR value may be mapped to, and represented by, a particular "rate" that is supported by the MIMO system. The rate is indicative of the specific data rate and coding and modulation scheme to be used for the data stream on the corresponding transmit antenna.

The beam-forming transmission scheme only requires one SNR value for the selected eigenmode (or one rate value) and the singular vector, v, used for beam-forming the data transmission on the selected eigenmode. The singular vector is composed of $N_T$ complex channel gains, one for each transmit antenna. If the number of bits used to quantize each real or imaginary dimension of each complex channel gain is denoted as Q, then the total number of bits needed to code the singular vector is $2N_T Q$ Table 1 lists the number of bits needed to represent the different types of CSI for the partial-CSI and beam-forming transmission schemes for a MIMO system with $N_T$ transmit antennas and M possible rates. In Table 1, the symbol "⌈ ⌉" denotes the next highest integer value of the quantity within the bracket.

TABLE 1

|  | Partial-CSI | Beam-Forming |
| --- | --- | --- |
| Coding/Modulation | $N_T \lceil \log_2(M) \rceil$ | $\lceil \log_2(M) \rceil$ |
| Singular Vector | 0 | $2N_T Q$ |

In general, it is desirable to quantize the complex channel gains for the singular vector to as few bits as possible to reduce the amount of information to be reported back to the transmitter. However, the quantization should not noticeably degrade performance.

Table 2 shows the degradation in SNR (in dB) for different numbers of quantization bits, Q, used to represent each dimension of a complex channel gain of the singular vector. The degradation shown in Table 2 is obtained based on a 4×4 MIMO system operating in the beam-forming mode. The degradation in SNR due to the quantization is a function of the number of quantization bits only and is not a function of the operating SNR. This degradation is shown versus for different values of Q ranging from two through five.

TABLE 2

|  | Number of Bits (Q) | | | |
| --- | --- | --- | --- | --- |
|  | 2 | 3 | 4 | 5 |
| Degradation in SNR (dB) | 6.12 | 2.7 | 1.25 | 0.6 |

As shown in Table 2, as low as four bits/dimension (i.e., Q=4), or eight bits/complex channel gain, may be used to encode the singular vector. Five bits/dimension (i.e., Q=5), or ten bits/complex channel gain value, provides even better performance. The number of bits required to adequately represent each complex channel gain may also be a function of the dimensionality of the MIMO system. For example, a 3×3 or 2×2 MIMO system may require even fewer than four or five bits per (real or imaginary) dimension of the complex channel gain.

System

Figure 3:
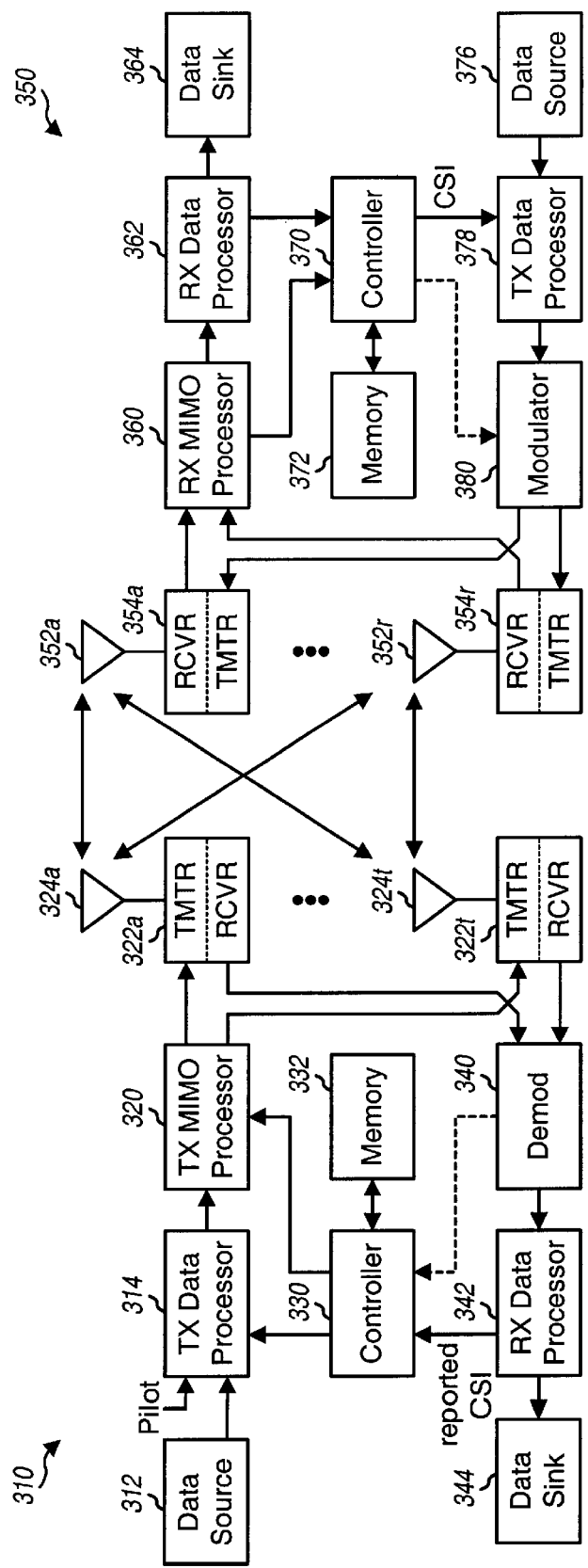
FIG. 3 is a block diagram of an embodiment of a transmitter system and a receiver system.

FIG. 3 is a block diagram of an embodiment of a transmitter system 310 and a receiver system 350, which are capable of implementing various aspects and embodiments described herein.

At transmitter system 310, traffic data is provided from a data source 312 to a transmit (TX) data processor 314, which formats, codes, and interleaves the traffic data based on one or more coding schemes to provide coded data. The coded traffic data may then be multiplexed with pilot data using, e.g., time division multiplex (TDM) or code division multiplex (CDM) in all or a subset of the transmission channels to be used for data transmission. The pilot data is typically a known data pattern processed in a known manner, if at all. The multiplexed pilot and coded traffic data is then modulated (i.e., symbol mapped) based on one or more modulation schemes (e.g., BPSK, QSPK, M-PSK, or M-QAM) to provide modulation symbols. The data rate, coding, interleaving, and modulation for each transmission channel or each group of transmission channels may be determined by various controls provided by a controller 330.

A TX MIMO processor 320 may further process the modulation symbols in accordance with a processing scheme corresponding to the current operating mode for transmitter system 310. Each transmission scheme may be associated with a respective operating mode, and each operating mode may correspond to a specific processing scheme for the modulation symbols. For the partial-CSI transmission scheme, TX MIMO processor 320 simply passes the stream of modulation symbols for each data stream to a respective transmitter (TMTR) 322. For the beam-forming transmission scheme, TX MIMO processor 320 pre-conditions the single stream of modulation symbols for the selected eigenmode based on the singular vector, v, associated with this eigenmode. The pre-conditioning may be performed by multiplying each modulation symbol with each of the $N_T$ entries for the singular vector to provide $N_T$ scaled symbols. $N_T$ streams of scaled symbols are thus provided for the $N_T$ entries of the singular vector. The pre-conditioning with the singular vector effectively performs beam-forming for the data stream. In either case, $N_T$ scaled or unscaled modulation symbol streams are provided to transmitters 322a through 322t.

Each transmitter 322 receives and processes a respective symbol stream. For an OFDM system, each transmitter transforms the symbols (e.g., using inverse fast Fourier transform (IFFT)) to form OFDM symbols, and may further append a cyclic prefix to each OFDM symbol to form a corresponding transmission symbol. Each transmitter al converts the symbol stream into one or more analog signals and further conditions (e.g., amplifies, filters, and quadrature modulates) the analog signals to generate a modulated signal suitable for transmission over the MIMO channel. $N_T$ modulated signals from transmitters 322a through 322t are then transmitted from $N_T$ antennas 324a through 324t, respectively.

At receiver system 350, the transmitted modulated signals are received by $N_R$ antennas 352a through 352r, and the received signal from each antenna 352 is provided to a respective receiver (RCVR) 354. Each receiver 354 conditions (e.g., filters, amplifies, and downconverts) the received signal and digitizes the conditioned signal to provide a respective stream of samples. Each sample stream may further be processed (e.g., demodulated with a recovered pilot) to obtain a corresponding stream of received symbols (denoted as y).

A RX MIMO processor 360 then receives and processes the $N_R$ received symbol streams based on one of a number of spatial receiver processing techniques to provide $N_T$ recovered symbol streams (denoted as r). For example, RX MIMO processor 360 may implement the CCMI, CCMI-SC, MMSE, MMSE-SC, or some other receiver processing technique. These various receiver processing techniques are described in detail in the aforementioned U.S. patent application Ser. No. 09/993,087.

A receive (RX) data processor 362 then demodulates, deinterleaves, and decodes the recovered symbols to provide the transmitted traffic data. The processing by RX MIMO processor 360 and RX data processor 362 is complementary to that performed by TX MIMO processor 320 and TX data processor 314, respectively, at transmitter system 310.

RX MIMO processor 360 may further derive an estimate of the SNRs for the transmission channels, the channel gains for the singular vector corresponding to the eigenmode with the highest eigenvalue (or best SNR), and so on, and provide this information to a controller 370. RX data processor 362 may also provide the status of each received frame or packet, one or more other performance metrics indicative of the decoded results, and possibly other information. Controller 370 collects the pertinent CSI, which may comprise all or some of the information received from RX MIMO processor 360 and RX data processor 362. This CSI is then processed by a TX data processor 378, modulated by a modulator 380, conditioned by transmitters 354a through 354r, and transmitted back to transmitter system 310.

At transmitter system 310, the modulated signals from receiver system 350 are received by antennas 324, conditioned by receivers 322, demodulated by a demodulator 340, and processed by a RX data processor 342 to recover the pertinent CSI reported by the receiver system. The reported CSI is then provided to controller 330 and used to select the transmission scheme and to generate various controls for TX data processor 314 and TX MIMO processor 320.

Controllers 330 and 370 direct the operation at the transmitter and receiver systems, respectively. Memories 332 and 372 provide storage for program codes and data used by controllers 330 and 370, respectively.

To implement the multi-mode transmission techniques described above, controller 330 receives the pertinent CSI from receiver system 350, which may include the post-processed SNRs, the singular vector, and/or some other information descriptive of the characteristics or operating condition of the MIMO channel. Controller 330 then (1) selects a particular transmission scheme to use for transmitting data, and (2) determines the rate to use for each selected transmission channel. The rate (i.e., the data rate and the coding and modulation scheme) to be used for each selected transmission channel is determined based in part on the amount of transmit power allocated to the data stream. The power allocation and rate determination may also be performed by some network entity rather than at the transmitter system.

The multi-mode transmission techniques described herein may be implemented by various means. For example, these techniques may be implemented in hardware, software, or a combination thereof. For a hardware implementation, the elements used to implement these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, certain aspects of the multi-mode transmission techniques may be implemented with modules (e.g., procedures, functions, and so on) that perform the functions described herein. The software codes may be stored in a memory unit (e.g., memory 332 in FIG. 3) and executed by a processor (e.g., controller 330). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data over a plurality of transmission channels in a wireless communication system, comprising:

determining an operating condition of the communication system;

identifying a specific power allocation transmission scheme selected from among a plurality of possible power allocation transmission schemes based on the determined operating condition;

determining one or more data streams to be transmitted based on the selected transmission scheme; and processing the one or more data streams based on the selected transmission scheme, wherein the operating condition is quantified by a signal-to-noise-and-interference ratio (SNR), and wherein a partial-CSI transmission scheme is selected for use if an operating SNR of the communication system is above a threshold SNR, and a beam-forming transmission scheme is selected for use if the operating SNR is below the threshold SNR.

2. The method of claim 1, wherein the specific transmission scheme is selected by evaluating performance of each of the plurality of possible transmission scheme.

3. The method of claim 1, wherein the specific transmission scheme is selected based on an operating signal-to-noise-and-interference ratio (SNR).

4. The method of claim 1, wherein the one or more data streams are further processed based on channel-state information.

5. The method of claim 4, wherein the plurality of transmission schemes includes a partial channel-state information (CSI) transmission scheme.

6. The method of claim 5, wherein the channel-state information for the partial-CSI transmission scheme comprises signal-to-noise-and-interference ratios (SNRs).

7. The method of claim 4, wherein the plurality of transmission schemes include a beam-forming transmission scheme.

8. The method of claim 7, wherein a single transmission channel is selected for use for the beam-forming transmission scheme, and wherein beam-forming is used for a data transmission on the single selected transmission channel.

9. The method of claim 7, wherein the channel-state information for the beam-forming transmission scheme comprises signal-to-noise-and-interference ratio (SNR) and a singular vector for a single selected transmission channel.

10. The method of claim 9, wherein each element of the singular vector is quantized to five bits or less per dimension.

11. The method of claim 4, wherein the plurality of transmission schemes include a beam-steering transmission scheme.

12. The method of claim 11, wherein the channel-state information for the beam-steering transmission scheme comprises signal-to-noise-and-interference ratio (SNR) and a vector of phase values for a plurality of transmit antennas used for data transmission.

13. The method of claim 12, wherein the vector of phase values is based on a singular vector for a principal eigenmode.

14. The method of claim 1, further comprising:

selecting a rate for each data stream based on a signal-to-noise-and-interference ratio (SNR) achievable for the data stream.

15. The method of claim 1, wherein the wireless communication system is a multiple-input multiple-output (MIMO) communication system and the plurality of transmission channels correspond to a plurality of spatial subchannels of the MIMO communication system.

16. The method of claim 1, wherein the wireless communication system is a wideband multiple-input multiple-output (MIMO) communication system and the plurality of transmission channels correspond to a plurality of spatial subchannels of a plurality of frequency bands.

17. The method of claim 16, wherein one transmission scheme is selected for use for all frequency bands, and wherein one or more data streams are transmitted on each frequency band and are processed based on the selected transmission scheme.

18. The method of claim 16, wherein one transmission scheme is selected for use for each frequency band, and wherein one or more data streams are transmitted on each frequency band and are processed based on the transmission scheme selected for that frequency band.

19. The method of claim 16, wherein a beam-forming transmission scheme is selected for use for each of the plurality of frequency bands.

20. The method of claim 19, wherein total transmit power is allocated such that a common coding and modulation scheme is used for all data streams transmitted on the plurality of frequency bands.

21. The method of claim 16, wherein a partial-CSI transmission scheme is selected for use for each of the plurality of frequency bands.

22. The method of claim 21, wherein total transmit power is allocated such that a common coding and modulation scheme is used for all data streams transmitted on each frequency band.

23. The method of claim 21, wherein total transmit power is allocated such that a common coding and modulation scheme is used for all data streams transmitted on each spatial subchannel.

24. The method of claim 1, wherein the wireless communication system is an orthogonal frequency division multiplexing (OFDM) communication system and the plurality of transmission channels correspond to a plurality of frequency subchannels.

25. A method for transmitting data on a plurality of spatial subchannels in a multiple-input multiple-output (MIMO) communication system, comprising:

determining an operating signal-to-noise-and-interference ratio (SNR) of the MIMO system;

identifying a specific power allocation transmission scheme selected from among a plurality of possible power allocation transmission schemes based on the operating SNR, wherein each of the plurality of transmission schemes is designated for use for a respective range of operating SNRs;

determining one or more data streams to be transmitted based on the selected transmission scheme; and processing the one or more data streams based on the selected transmission scheme, wherein the plurality of transmission schemes include a partial-CSI transmission scheme and a beam-forming transmission scheme, and wherein the partial-CSI transmission scheme is selected for use if the operating SNR is above a threshold SNR and the beam-forming transmission scheme is selected for use if the operating SNR is below the threshold SNR.

26. An apparatus in a wireless communication system, comprising:

means for determining an operating condition of the communication system;

means for identifying a specific power allocation transmission scheme selected from among a plurality of possible power allocation transmission schemes based on the determined operating condition;

means for determining one or more data streams to be transmitted based on the selected transmission scheme; and means for processing the one or more data streams based on the selected transmission scheme;

wherein the specific transmission scheme is selected based on an operating signal-to-noise-and-interference ratio (SNR) of the communication system, and wherein each of the plurality of transmission schemes is designated for use for a respective range of operating SNRs, wherein the plurality of transmission schemes include a partial-CSI transmission scheme and a beam-forming transmission scheme, and wherein the partial-CSI transmission scheme is selected for use if the operating SNR is above a threshold SNR and the beam-forming transmission scheme is selected for use if the operating SNR is below the threshold SNR.

27. The apparatus of claim 26, wherein the wireless communication system is a multiple-input multiple-output (MIMO) communication system and the plurality of transmission channels correspond to a plurality of spatial subchannels of the MIMO communication system.

28. The apparatus of claim 26, further comprising:

means for selecting a rate for each data stream based on a signal-to-noise-and-interference ratio (SNR) achievable by the data stream.

29. A transmitter unit in a wireless communication system, comprising:

a controller operative to direct data transmission over a plurality of transmission channels by
  receiving an indication of an operating condition of the communication system,
  identifying a specific power allocation transmission scheme selected from among a plurality of possible power allocation transmission schemes based on the operating condition,
  determining one or more data streams to be transmitted based on the selected transmission scheme,
  selecting a rate for each data stream based in part on an amount of transmit power allocated to the data stream, and
  directing processing of the one or more data streams based on the selected transmission scheme;

a transmit (TX) data processor operative to process each data stream based on the selected rate to provide a respective stream of symbols; and one or more transmitters operative to process one or more symbol streams to provide one or more modulated signals suitable for transmission over a communication channel;

wherein the plurality of transmission schemes include a partial-CSI transmission scheme and a beam-forming transmission scheme and wherein the controller is operative to select the partial-CSI transmission scheme if an operating signal-to-noise-and-interference ratio (SNR) of the communication system is above a threshold SNR and to select the beam-forming transmission scheme if the operating SNR is below the threshold SNR.

30. The transmitter unit of claim 29, wherein the controller is further operative to utilize peak transmit power for each data stream for the partial-CSI transmission scheme and to allocate all transmit power to a single data stream for the beam-forming transmission scheme.

31. The transmitter unit of claim 29, further comprising:

a TX MIMO processor operative to precondition the stream of symbols for a single data stream based on a singular vector for the beam-forming transmission scheme.

32. A base station comprising the transmitter unit of claim 29.

33. A receiver unit in a wireless communication system, comprising:

a receive (RX) MIMO processor operative to receive and process a plurality of streams of received symbols in accordance with a particular receiver processing scheme to provide at least one stream of recovered symbols, and to derive channel-state information (CSI) for each recovered symbol stream;

a RX data processor operative to process at least one recovered symbol stream in accordance with at least one demodulation and decoding scheme to provide decoded data; and a TX data processor operative to process the CSI for transmission back to a transmitter unit, and wherein a specific power allocation transmission scheme is selected from among a plurality of possible power allocation transmission schemes based on the CSI, wherein one or more data streams are transmitted to the receiver unit based on the selected power allocation transmission scheme, wherein total available transmit power is allocated to the one or more data streams based on the selected power allocation transmission scheme, wherein the plurality of transmission schemes include a partial-CSI transmission scheme and a beam-forming transmission scheme, and wherein the partial-CSI transmission scheme is selected if an operating signal-to-noise-and-interference ratio (SNR) is above a threshold SNR and the beam-forming transmission scheme is selected if the operating SNR is below the threshold SNR.

34. The receiver unit of claim 33, wherein for the beam-forming transmission scheme the RX MIMO processor is further operative to pre-condition the plurality of received symbol streams with a singular vector to provide a single recovered symbol stream.

35. The receiver unit of claim 33, wherein for the partial-CSI transmission scheme the RX MIMO processor is further operative to process the plurality of received symbol streams based on a minimum mean square error with successive cancellation (MMSE-SC) receiver processing technique to provide a plurality of recovered symbol streams.

* * * * *